(12) United States Patent
Hou et al.

(10) Patent No.: US 8,279,949 B2
(45) Date of Patent: Oct. 2, 2012

(54) METHOD AND APPARATUS FOR ESTIMATING CHANNEL LENGTH IN WIRED COMMUNICATION SYSTEM

(75) Inventors: Wen-Sheng Hou, Hsinchu County (TW); Li-Hua Weng, Hsinchu County (TW); Guan-Henry Lin, Taichung (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 219 days.

(21) Appl. No.: 12/821,151

(22) Filed: Jun. 23, 2010

(65) Prior Publication Data
US 2011/0038404 A1 Feb. 17, 2011

(30) Foreign Application Priority Data
Aug. 17, 2009 (TW) .............................. 98127573 A (51) Int. Cl.
*H04B 3/00* (2006.01)
*H04L 25/00* (2006.01)

(52) U.S. Cl. ........ 375/257; 375/343; 375/346; 375/350; 702/97

(58) Field of Classification Search .................. 375/257, 375/343, 350, 346–349; 702/97
See application file for complete search history.

(56) References Cited

U.S. PATENT DOCUMENTS

| 6,614,236 B1 * | 9/2003 | Karam ........................... 324/532 |
| 7,724,692 B1 * | 5/2010 | Fang et al. ..................... 370/282 |

* cited by examiner

*Primary Examiner* — Curtis Odom
(74) *Attorney, Agent, or Firm* — Winston Hsu; Scott Margo (57) ABSTRACT

A method for estimating a length of a channel in a wired communication system includes receiving a plurality of signals transmitted continuously via the channel, determining relation between a signal and at least one signal in the of the plurality of signals, to generate a decision result, and determining the length of the channel according to the decision result.

13 Claims, 7 Drawing Sheets

| Channel length | 0m | 30m | 60m | 90m | 120m | 150m | 180m |
|---|---|---|---|---|---|---|---|
| w | 0 | 0.2 | 0.47 | 0.68 | 0.77 | 0.84 | 0.9 |

METHOD AND APPARATUS FOR ESTIMATING CHANNEL LENGTH IN WIRED COMMUNICATION SYSTEM

BACKGROUND OF THE INVENTION

1. Field of the Invention

The present invention relates to a method and apparatus for estimating a length of a channel in a wired communication system, and more particularly, to a method and apparatus capable of effectively estimating a length of a channel, such that a receiver can timely trigger a high-pass filter, to reduce error propagation and enhance reception efficiency.

2. Description of the Prior Art

In a wired communication system, a channel between a transmission terminal and a reception terminal is established upon a physical cable. Therefore, the communication quality is affected by the material, length, anti-noise ability of the cable. For example, in Gigabit Ethernet, a receiver selects a proper filter or algorithm according to a length of a cable, to reduce the possibility of error propagation in an equalizer, and enhance efficiency. Therefore, how to correctly estimate the cable length has become an important factor in Gigabit Ethernet.

For Gigabit Ethernet, there are two widely used methods for estimating a cable length. One is sending a pulse signal and estimating the cable length according to a round trip time of the signal or received signal energy. Such a method needs to send the extra pulse signals, and has less estimation accuracy under some circumstances, e.g. when power is too high or too low. The other method is determining the cable length according to parameters of a digital equalizer after the equalizer completely converges. In other words, if the equalizer undergoes error propagation, the cable length cannot be estimated.

Besides, the spectrum of received signals varies with the cable length, and another conventional method uses this phenomenon to determine the cable length in the Gigabit Ethernet system. Since a low frequency portion of the received signals is interfered with direct current (DC) signals in circuits, while a high frequency portion is affected by noise, both high-frequency and low-frequency responses are not suitable for estimating the cable length, and 6 MHz and 43 MHz are selected. However, to accurately calculate signal portions at 6 MHz and 43 MHz needs to perform complicate Discrete Fourier Transform, which involves a lot of multiplication and addition operations, leading to large circuit area and high production cost, difficult to meet practical requirement.

Therefore, the conventional methods for estimating the cable length in Gigabit Ethernet need to be improved.

SUMMARY OF THE INVENTION

It is therefore an objective of the present invention to provide a method and apparatus for estimating a length of a channel in a wired communication system.

The present invention discloses a method for estimating a length of a channel in a wired communication system. The method includes receiving a plurality of signals transmitted continuously via the channel, determining a relation between a signal and at least one previous signal in the plurality of signals, to generate a decision result, and determining the length of the channel according to the decision result.

The present invention further discloses an electronic device for estimating a length of a channel in a wired communication system. The electronic device includes a reception terminal, for receiving a plurality of signals transmitted continuously via the channel, a first decision unit, for determining a relation between a signal and at least one previous signal in the plurality of signals, to generate a decision result, and a second decision unit, for determining the length of the channel according to the decision result.

The present invention further discloses a method for processing received signals in a wired communication system. The method includes receiving a plurality of analog signals transmitted continuously via a channel, performing a low-pass filtering operation on the plurality of analog signals, to generate a plurality of low-pass analog signals, converting the plurality of low-pass analog signals into a plurality of digital signals, determining a relation between a digital signal and at least one previous digital signal in the plurality of digital signals, to generate a decision result, determining a length of the channel according to the decision result, and determining to utilize the low-pass filtering operation or a band-pass filtering operation to process analog signals received after the plurality of analog signals according to the length of the channel.

The present invention further discloses a reception device in a wired communication system. The reception device includes a reception terminal, for receiving a plurality of analog signals transmitted continuously via a channel, a filter module, for performing a low-pass filtering operation or a band-pass filtering operation on the plurality of analog signals according to a control signal, to output a plurality of low-pass analog signals or a plurality of band-pass analog signals, an analog to digital converter (ADC), for converting analog signals outputted by the filter module into a plurality of digital signals, and a channel length estimation module, coupled to the ADC. The channel length estimation module includes a first decision unit, for determining a relation between a digital signal and at least one previous digital signal in the plurality of digital signals, to generate a decision result, a second decision unit, for determining a length of the channel according to the decision result, and a control signal generator, for outputting the control signal according to the length of the channel, so as to determine to utilize the low-pass filtering operation or the band-pass filtering operation to process following analog signals.

These and other objectives of the present invention will no doubt become obvious to those of ordinary skill in the art after reading the following detailed description of the preferred embodiment that is illustrated in the various figures and drawings.

DETAILED DESCRIPTION

In a wired communication system, signals are transmitted via a physical cable, such that a length of a channel is fixed. In other words, the channel length provides the same effect on each transmitted signal, or unideal factors due to the channel length are the same in each received signal. However, since there are a lot of factors affecting the channel, it is time-consuming and difficult to analyze how a channel length affects the received signals or to accurately and individually quantify the factors affecting the received signals. In such a situation, the present invention utilizes an autoregressive concept to analyze a relation between a current signal and previous signals, so as to determine how environmental factors affect all signals.

An autoregressive model is widely used in statistics, and utilizes one or a plurality of previous data in a time sequence to describe current data, which can be interpreted as utilizing previous transmission results to describe a current transmission result in a wired communication system, and determine an autocorrelation function for estimating the channel length.

First, the autoregressive model is briefly illustrated. Noticeably, the autoregressive model is a common statistic technique, which is well known by those skilled in the art, and is not narrated in every detail.

A k-order linear autoregressive model is defined as:

$$X_t = C + \phi_{11} X_{t-1} + \phi_{22} X_{t-2} + \ldots + \phi_{kk} X_{t-k} + a_t, \quad \text{(Eq. 1)}$$

where $\phi_{11} = \rho_1$, $$\varphi_{22} = \frac{\begin{vmatrix} 1 & \rho_1 \\ \rho_1 & \rho_2 \end{vmatrix}}{\begin{vmatrix} 1 & \rho_1 \\ \rho_1 & 1 \end{vmatrix}}, \quad \varphi_{33} = \frac{\begin{vmatrix} 1 & \rho_1 & \rho_1 \\ \rho_1 & 1 & \rho_2 \\ \rho_2 & \rho_1 & \rho_3 \end{vmatrix}}{\begin{vmatrix} 1 & \rho_1 & \rho_2 \\ \rho_1 & 1 & \rho_1 \\ \rho_2 & \rho_1 & 1 \end{vmatrix}},$$

and $$\varphi_{kk} = \frac{\begin{vmatrix} 1 & \rho_1 & \rho_2 & \cdots & \rho_{k-2} & \rho_1 \\ \rho_1 & 1 & \rho_1 & \cdots & \rho_{k-3} & \rho_2 \\ \cdots & \cdots & \cdots & \cdots & \cdots & \cdots \\ \rho_{k-1} & \rho_{k-2} & \rho_{k-3} & \cdots & \rho_1 & \rho_k \end{vmatrix}}{\begin{vmatrix} 1 & \rho_1 & \rho_2 & \cdots & \rho_{k-2} & \rho_{k-1} \\ \rho_1 & 1 & \rho_1 & \cdots & \rho_{k-3} & \rho_{k-2} \\ \cdots & \cdots & \cdots & \cdots & \cdots & \cdots \\ \rho_{k-1} & \rho_{k-2} & \rho_{k-3} & \cdots & \rho_1 & 1 \end{vmatrix}} \quad \forall k \geq 3.$$

In Eq. 1, $\phi_{kk}$ is a k-th lag partial autocorrelation parameter) of Xt, $\{\phi_{kk}\}_{k=1}^{\infty}$ is a partial autocorrelation function (PACF), and $\{\rho_i\}_1^{\infty}$ is an autocorrelation function of the model, which reflects a correlation between sampling values of a sequence data sampled at different time. For the wired communication system, since the channel length is fixed, the channel length contributes the same factor to each received signal, and this factor reflects in the autocorrelation function. Therefore, a certain relation is between the autocorrelation function and the channel length, and can be determined by experiments or simulation in advance. In other words, in the wired communication system, after a reception terminal determines an autocorrelation function of a sequence of received signals, the channel length can be estimated by comparing the autocorrelation function with predefined experimental results. Methods and algorithms for calculating an autocorrelation function $\{\rho_i\}_1^{\infty}$ have been disclosed in related documents, and are not a key of the present invention, so are not narrated herein.

Figure 1:
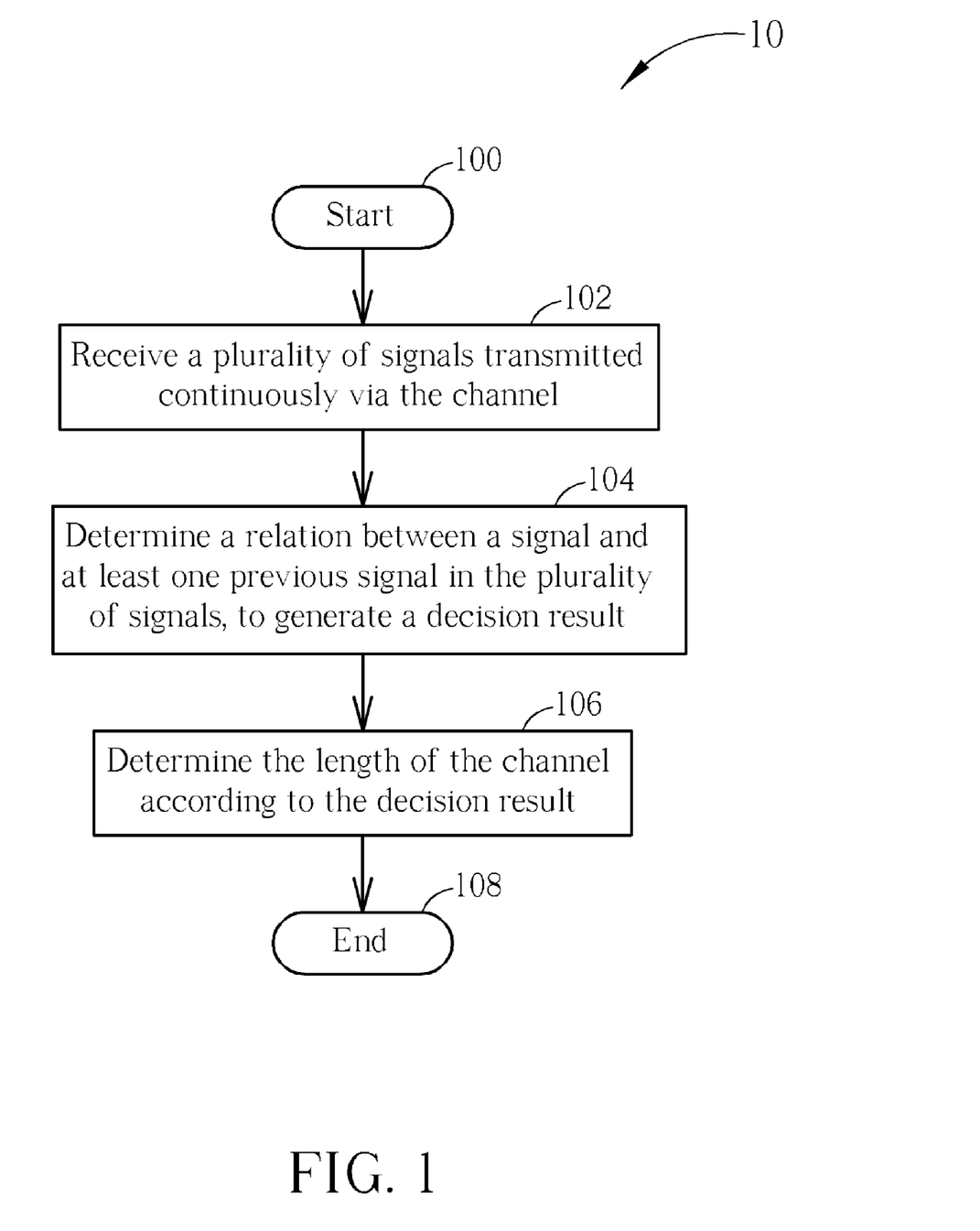
FIG. 1 is a schematic diagram of a channel length estimation process according to an embodiment of the present invention.

The above description is toward the inventive concept, and can be further summarized into a channel length estimation process 10, as shown in FIG. 1. The channel length estimation process 10 is utilized in a wired communication system to estimate a length of a channel, and includes the following steps:

Step 100: Start.
Step 102: Receive a plurality of signals transmitted continuously via the channel.
Step 104: Determine a relation between a signal and at least one previous signal in the plurality of signals, to generate a decision result.
Step 106: Determine the length of the channel according to the decision result.
Step 108: End.

In a word, after the successive signals are received, the reception terminal utilizes the autoregressive model to describe the current signal with the previous signals, so as to determine a relation between the current signal and the previous signals. Then, the channel length can be estimated by comparing the autocorrelation function derived from the autoregressive model with the predefined experimental results.

Figure 2:
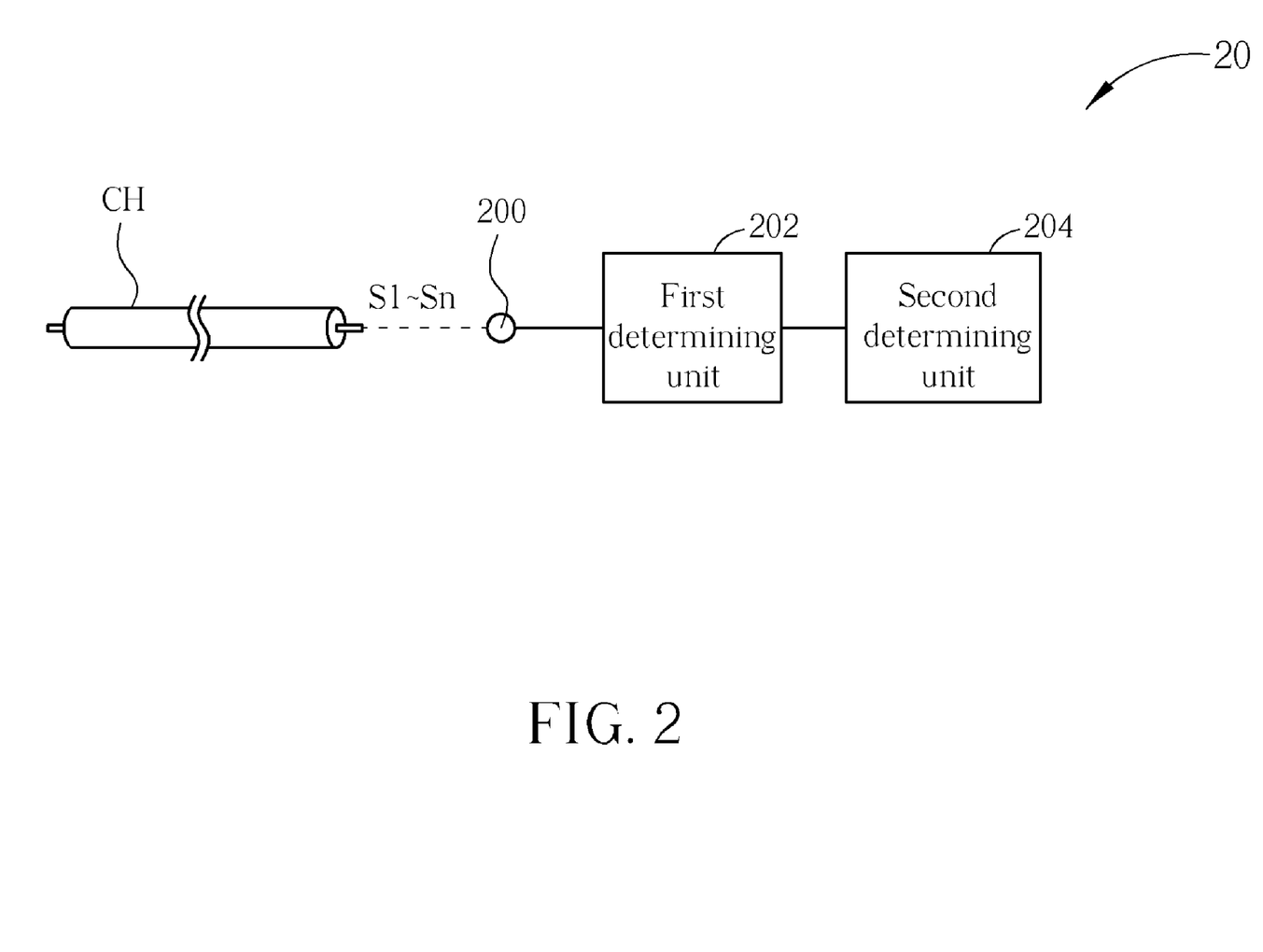
FIG. 2 is a schematic diagram of a channel length estimation device according to an embodiment of the present invention.

As for realization of the channel length estimation process 10, please refer to FIG. 2, which is a schematic diagram of a channel length estimating device 20. The channel length estimating device 20 is utilized for estimating a length of a channel CH established by a cable, and includes a reception terminal 200, a first determining unit 202 and a second determining unit 204. The reception terminal 200 is utilized for realizing the step 102, i.e. receiving signals S1~Sn continuously transmitted via the channel. The first determining unit 202 is utilized for realizing the step 104, i.e. utilizing the autoregressive model to describe the current signal with the previous signals, so as to determine a relation between the current signal and the previous signals. Finally, the second determining unit 204 is utilized for realizing the step 106, i.e. comparing the autocorrelation function derived from the autoregressive model with the predefined experimental results, to estimate the channel length.

Noticeably, the channel length estimating device 20 is merely an embodiment of the present invention, in order to estimate the length of the channel CH. In practical, different wired communication systems may employ different communication techniques, channel parameters, etc. Therefore, those skilled in the art should make proper modifications according to different system requirements based on the above description, for correctly estimating the channel length.

Figure 3:
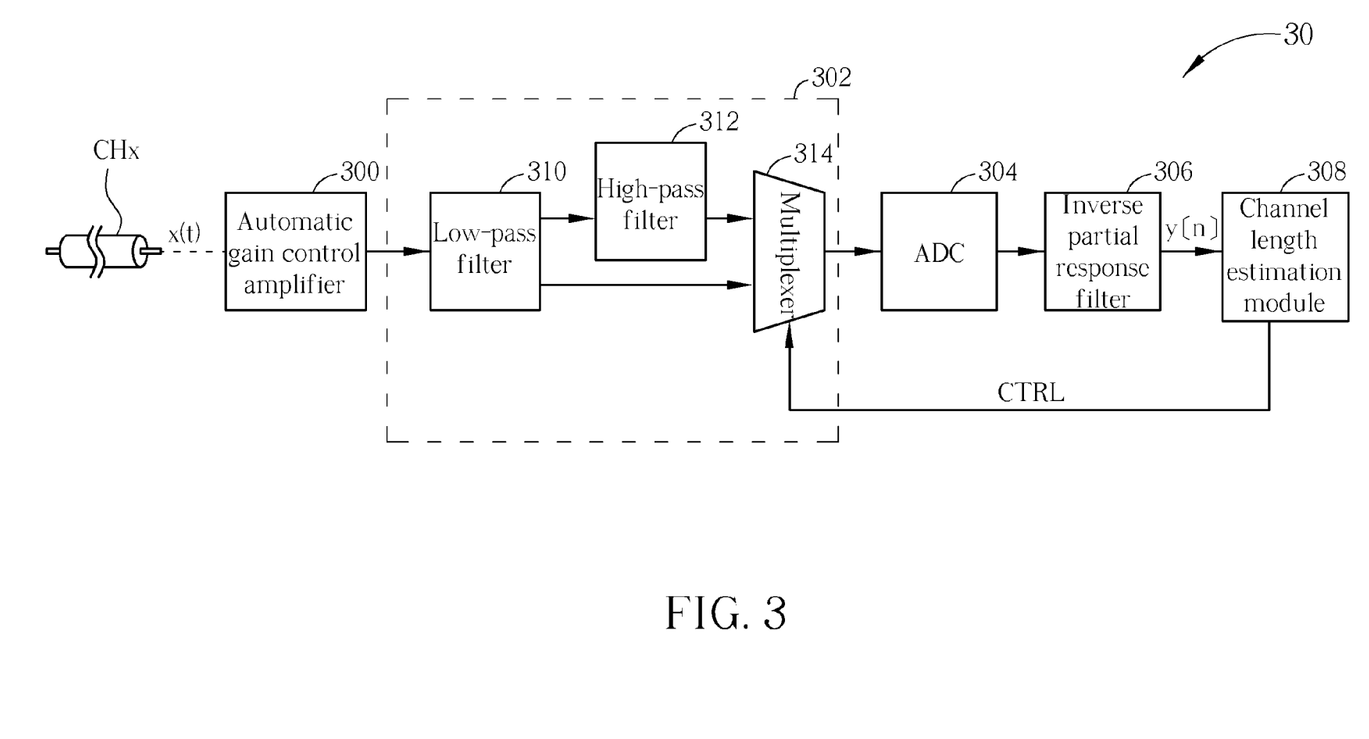
FIG. 3 is a schematic diagram of a reception device according to an embodiment of the present invention.

For example, please refer to FIG. 3, which is a schematic diagram of a reception device 30 according to an embodiment of the present invention. The reception device 30 is utilized in a Gigabit Ethernet system, and includes an automatic gain control amplifier 300, a filter module 302, an analog to digital converter (ADC) 304, an inverse partial response filter 306 and a channel length estimation module 308. The automatic gain control amplifier 300 automatically adjusts gain, to properly amplify amplitude of an analog signal x(t) received via a channel CHx. The filter module 302 includes a low-pass filter 310, a high-pass filter 312 and a multiplexer 314. The low-pass filter 310 performs low-pass filtering operations on signals outputted by the automatic gain control amplifier 300, and the high-pass filter 312 performs high-pass filtering operations on low-pass signals outputted by the low-pass filter 310. In other words, signals outputted by the high-pass filter 312 are bandpass signals. According to a control signal CTRL outputted by the channel length estimation module 308, the multiplexer 314 transfers the low-pass signals outputted by the low-pass filter 310 or the bandpass signals outputted by the high-pass filter 312 to the ADC 304, to perform analog-to-digital conversion. Besides, the inverse partial response filter 306 is utilized for compensating a partial response filter in a transmission terminal, and outputs a digital signal y[n] for the channel length estimation module 308 to determine the length of the channel CHx. Realization of the channel length estimation module 308 is similar to the channel length estimating device 20 shown in FIG. 2, and utilizes the autoregressive model to describe current signal with previous signals, so as to determine a relation between the current signal and the previous signals and estimate the channel length by comparing the autocorrelation function with the predefined experimental results. Differences between the channel length estimation module 308 and the channel length estimating device 20 are: signals processed by the channel length estimation module 308 are in a digital format, while signals processed by the channel length estimating device 20 are analog. Moreover, the channel length estimation module 308 should further include a control signal generator, for generating the control signal CTRL according to a channel length estimation result. Preferably, before the channel length is determined, the channel length estimation module 308 controls the multiplexer 314 to output the low-pass filtering result of the low-pass filter 310 to the ADC 304.

In the reception device 30, elements or units other than the channel length estimation module 308 are commonly used in a conventional reception device of the Gigabit Ethernet system, whose detailed operations are not a key of the present invention, and thus not narrated herein.

Figure 4:
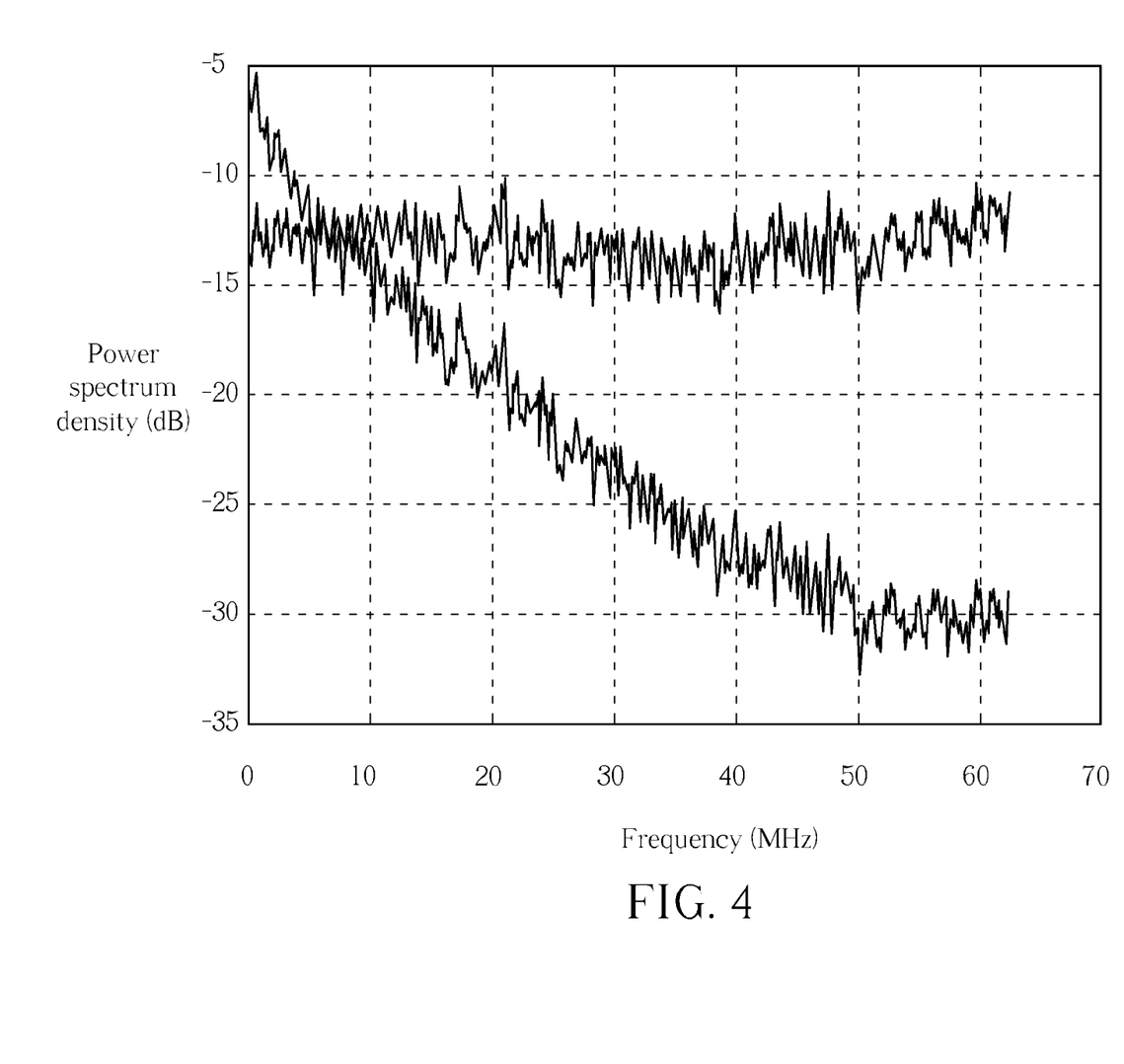
FIG. 4 is a schematic diagram of power spectrum density of a digital signal shown in FIG. 3 for different channel lengths.

For further description of the concept of the present invention, please refer to FIG. 4, which is a schematic diagram of power spectrum density of the digital signal y[n] when the length of the channel CHx shown in FIG. 3 is 0 and 150 m, respectively. As can be seen from FIG. 4, if the channel CHx is shorter, noise effect is relatively small, such that energy is evenly distributed in each frequency band; on the contrary, if the channel CHx is longer, noise effect is relatively high, such that energy is concentrated in the low frequency band. Such a result is in conformity with the above concept, i.e. if the channel CHx is shorter, the channel length contributes less unideal factors in signals, and if the channel CHx is longer, the channel length contributes unideal factors beyond noise. Noise is generally assumed to comply with an additive white Gaussian model, i.e. a random signal with autocorrelation function equal to 0. In other words, each sampling value of noise is not related to previous sampling values. Therefore, utilizing the autocorrelation function derived from the autoregressive model can reflect how much unideal factors the channel length contributes in signals, and the channel length can be determined accordingly.

For example, if the channel length estimation module 308 utilizes a first order autoregressive model to estimate the length of the channel CHx, then:

$$y[n]=w\cdot y[n-1]+e[n], \quad (Eq. 2)$$

where e[n] denotes noise, and w is the autocorrelation function in the first order autoregressive model. The following value equation is further derived from Eq. 2:

$$J=E\{|y[n]-w\cdot y[n-1]|^2\}, \quad (Eq. 3)$$

Accordingly, an optimum value $w_{opt}$ of w can be obtained by:

$$w_{opt} = \frac{E\{y[n-1]\cdot y[n]\}}{E\{y^2[n-1]\}}, \quad (Eq. 4)$$

Then, utilize a least mean square algorithm, to obtain the following equations, whereby µ denotes a step size:

$$w_{n+1}=w_n+2\mu\cdot y[n-1]\cdot(y[n]-w_n\cdot y[n-1])), \quad (Eq. 5)$$

or $$w_{n+1}=w_n+2\mu\cdot sign\{y[n-1]\}\cdot(y[n]-w_n\cdot y[n-1])), \quad (Eq. 6).$$

Figure 5:
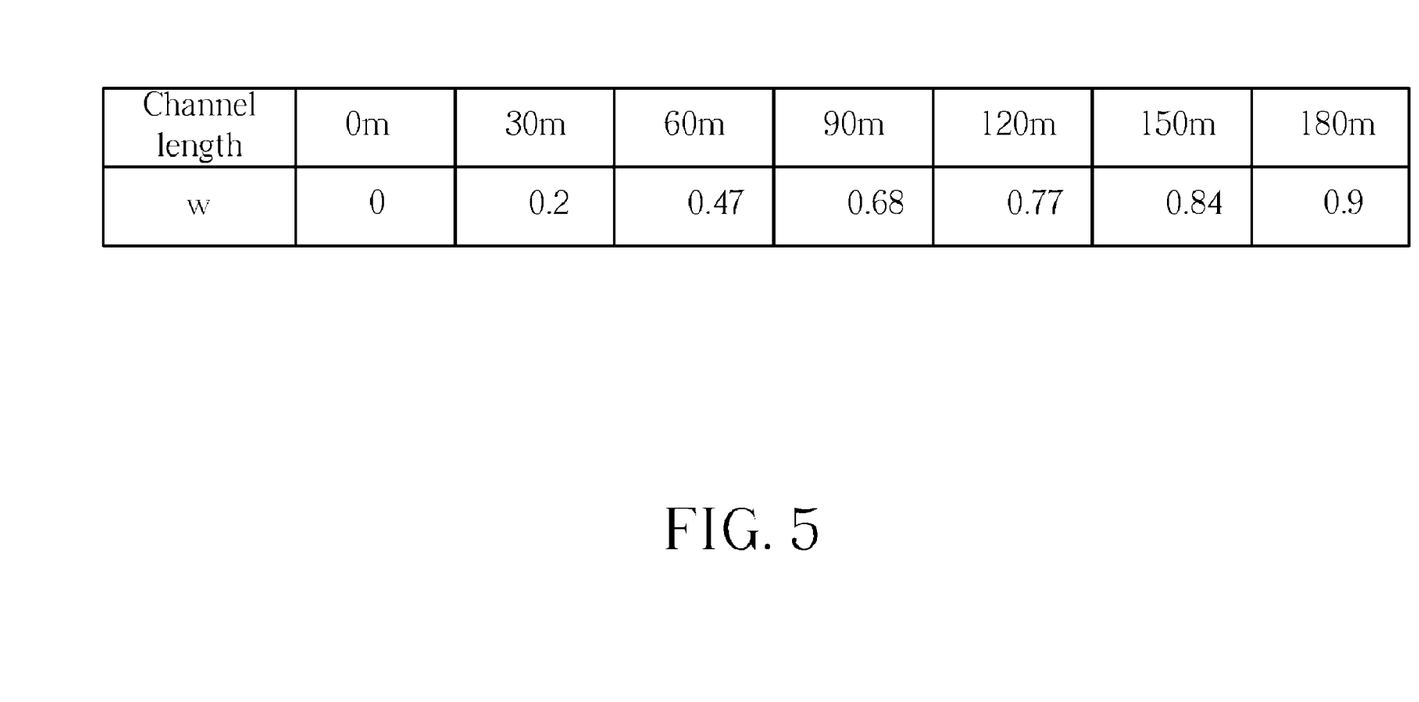
FIG. 5 is a schematic diagram of a relation between the autocorrelation function and the length of a channel.

Finally, a relation between w and the length of the channel CHx can be acquired from experiments, as shown in FIG. 5. Therefore, after the channel length estimation module 308 calculates W, the length of the channel CHx is determined by comparing w to FIG. 5.

Noticeably, the above Eq. 2 to Eq. 6 are utilized for illustrating a possible implementation of the present invention. In practical, the order of the autoregressive model, derivation of the autocorrelation function, experimental results, etc. can be properly adjusted according to different system requirement, so as to correctly determine the channel length.

Figure 6:
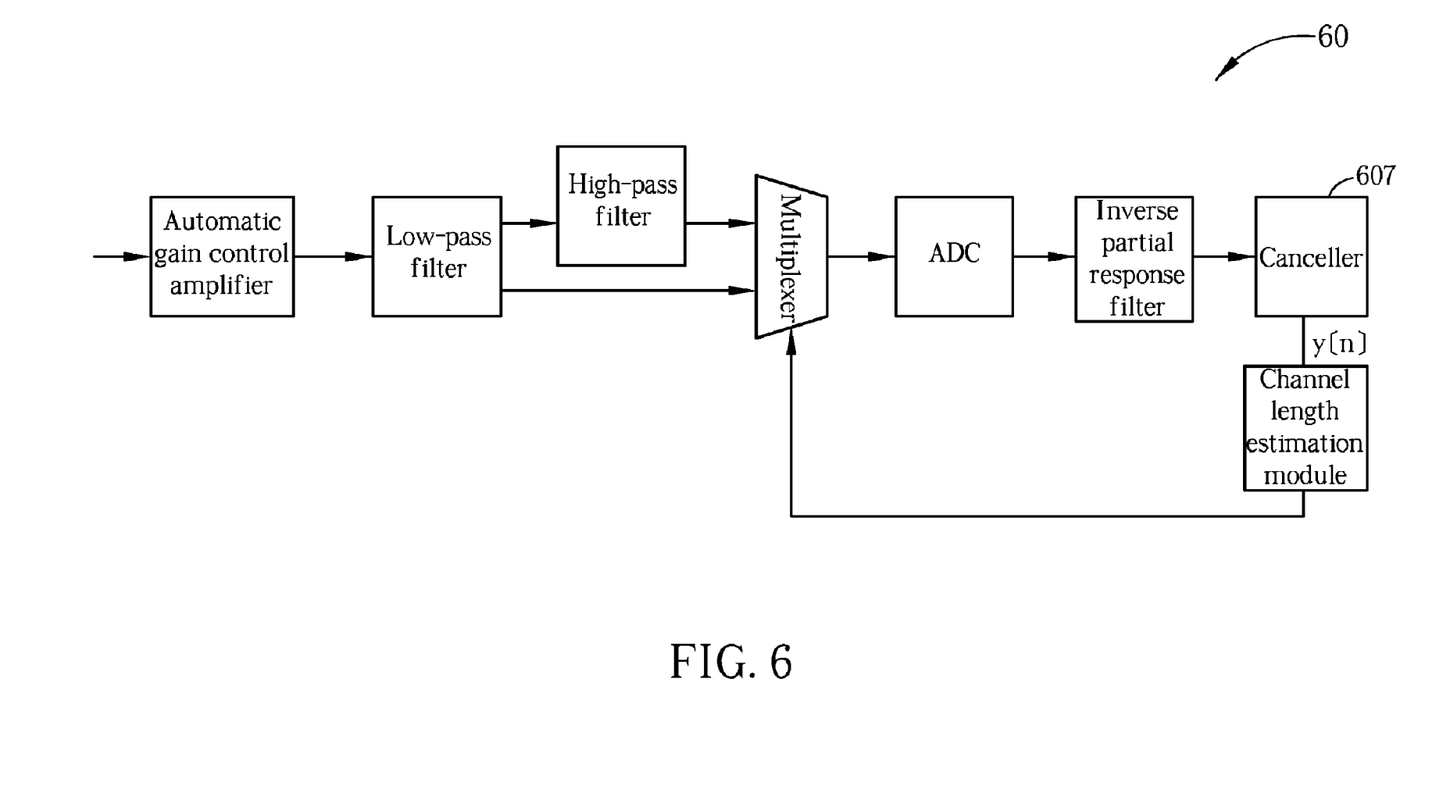
FIG. 6 is a schematic diagram of a reception device according to another embodiment of the present invention.

In addition, the reception device 30 shown in FIG. 3 is utilized for illustrating a possible application of the present invention, and those skilled in the art can make modifications according to system requirements. For example, FIG. 6 is a schematic diagram of a reception device 60 according to another embodiment of the present invention. The reception device 60 is utilized in the Gigabit Ethernet system as well, and structure and operations of the reception device 60 are similar to those of the reception device 30, for utilizing the autocorrelation function derived from the autoregressive model to determine the channel length, and controlling to output the low-pass filtering result or the bandpass filtering result to the ADC. Difference between the reception device 60 and the reception device 30 is an echo and near end crosstalk canceller 607 is added between the inverse partial response filter and the channel length estimation module of the reception device 60, for more accurately estimating the channel length.

Figure 7:
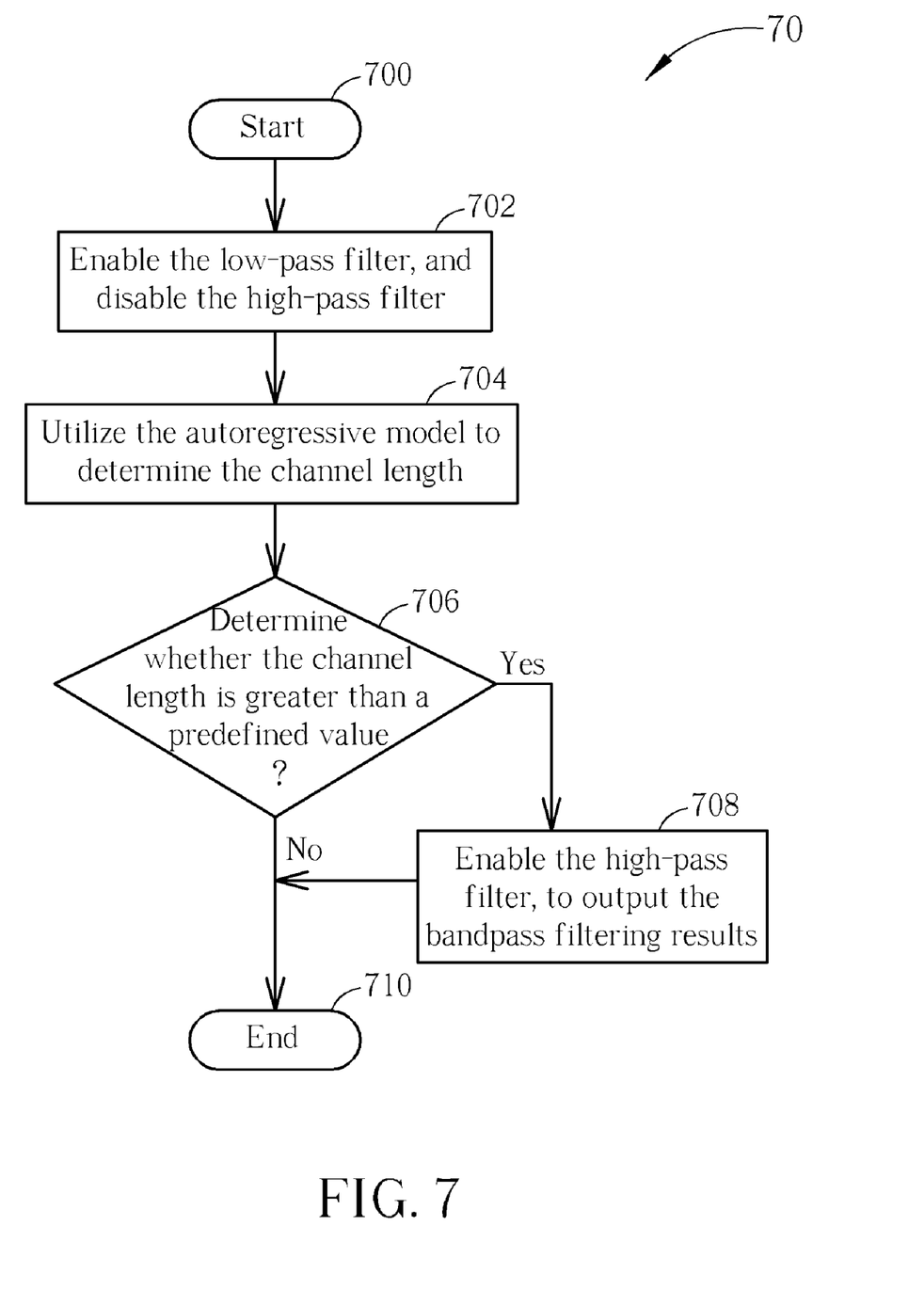
FIG. 7 is a schematic diagram of a reception signal processing process according to an embodiment of the present invention.

The above operations of the reception device 30 or 60 can be further summarized into a reception signal processing process 70 as shown in FIG. 7, which includes the following steps:

Step 700: Start.
Step 702: Enable the low-pass filter, and disable the high-pass filter.
Step 704: Utilize the autoregressive model to determine the channel length.
Step 706: Determine whether the channel length is greater than a predefined value. If yes, go to step 708; otherwise, go to step 710.
Step 708: Enable the high-pass filter, to output the bandpass filtering results.
Step 710: End.

The reception signals processing process 70 illustrates that the reception device 30 or 60 utilizes the autoregressive model to determine the channel length, and determines to only enable the low-pass filter or simultaneously enable the low-pass filter and the high-pass filter accordingly. Detailed description can be referred to the above description.

To sum up, the present invention utilizes the autoregressive model to describe the current signal with the previous signals, so as to determine a relation between the current signal and the previous signals. Then, the present invention compares the derived autocorrelation function with the predefined experimental results, to estimate the channel length, so as to determine whether to enable the high-pass filter. In other words, the present invention neither needs to send a pulse signal, nor waits for convergence of an equalizer, for estimating the channel length. In such a situation, the estimated channel length can be utilized for determining some parameters of the equalizer, to further avoid error propagation. Therefore, the present invention can effectively estimate the channel length, such that the receiver can timely enable the high-pass filter, to reduce possibility of error propagation and enhances reception efficiency.

Those skilled in the art will readily observe that numerous modifications and alterations of the device and method may be made while retaining the teachings of the invention.

What is claimed is:

1. A method for estimating a length of a channel in a wired communication system, comprising:
    receiving a plurality of signals transmitted continuously via the channel;
    determining a relation between a signal and at least one previous signal in the plurality of signals, to generate a decision result; and
    determining the length of the channel according to the decision result;
    wherein the step of determining the relation between the signal and the at least one previous signal in the plurality of signals to generate the decision result comprises utilizing an autoregressive model to describe the signal with the at least one signal, and outputting a corresponding autocorrelation function of the autoregressive model as the decision result.

2. The method of claim 1, wherein the step of determining the length of the channel according to the decision result comprises comparing the decision result with a plurality of predefined experimental results to determine the length of the channel.

3. An electronic device for estimating a length of a channel in a wired communication system, comprising:
    a reception terminal, for receiving a plurality of signals transmitted continuously via the channel;
    a first decision unit, for determining a relation between a signal and at least one previous signal in the plurality of signals, to generate a decision result; and
    a second decision unit, for determining the length of the channel according to the decision result;
    wherein the first decision unit utilizes an autoregressive model to describe the signal with the at least one signal, and outputs a corresponding autocorrelation function of the autoregressive model as the decision result.

4. The electronic device of claim 3, wherein the second decision unit compares the decision result with a plurality of predefined experimental results to determine the length of the channel.

5. A method for processing received signals in a wired communication system, comprising:
    receiving a plurality of analog signals transmitted continuously via a channel;
    performing a low-pass filtering operation on the plurality of analog signals, to generate a plurality of low-pass analog signals;
    converting the plurality of low-pass analog signals into a plurality of digital signals;
    determining a relation between a digital signal and at least one previous digital signal in the plurality of digital signals, to generate a decision result;
    determining a length of the channel according to the decision result; and
    determining to utilize the low-pass filtering operation or a band-pass filtering operation to process analog signals received after the plurality of analog signals according to the length of the channel.

6. The method of claim 5, wherein the step of determining the relation between the digital signal and the at least one previous digital signal in the plurality of digital signals to generate the decision result comprises utilizing an autoregressive model to describe the digital signal with the at least one digital signal, and outputting a corresponding autocorrelation function of the autoregressive model as the decision result.

7. The method of claim 5, wherein the step of determining the length of the channel according to the decision result comprises comparing the decision result with a plurality of predefined experimental results to determine the length of the channel.

8. A reception device in a wired communication system comprising:
    a reception terminal, for receiving a plurality of analog signals transmitted continuously via a channel;
    a filter module, for performing a low-pass filtering operation or a band-pass filtering operation on the plurality of analog signals according to a control signal, to output a plurality of low-pass analog signals or a plurality of band-pass analog signals;
    an analog to digital converter (ADC), for converting analog signals outputted by the filter module into a plurality of digital signals; and
    a channel length estimation module, coupled to the ADC, comprising:
        a first decision unit, for determining a relation between a digital signal and at least one previous digital signal in the plurality of digital signals, to generate a decision result;
        a second decision unit, for determining a length of the channel according to the decision result; and
        a control signal generator, for outputting the control signal according to the length of the channel, so as to determine to utilize the low-pass filtering operation or the band-pass filtering operation to process following analog signals.

9. The reception device of claim 8, wherein the first decision unit utilizes an autoregressive model to describe the digital signal with the at least one digital signal, and outputs a corresponding autocorrelation function of the autoregressive model as the decision result.

10. The reception device of claim 8, wherein the second decision unit compares the decision result with a plurality of predefined experimental results to determine the length of the channel.

11. The reception device of claim 8, wherein the filter module comprises:
    a low-pass filter, for performing the low-pass filtering operation on the plurality of analog signals, so as to generate the plurality of low-pass analog signals;
    a high-pass filter, for performing a high pass filtering operation on the plurality of low-pass analog signals, so as to perform the band-pass filtering operation on the plurality of analog signals, and generate the plurality of band-pass analog signals; and
    a multiplexer, coupled to the low-pass filter, the high-pass filter and the ADC, for outputting the plurality of low-pass analog signals or the plurality of band-pass analog signals according to the control signal.

12. The reception device of claim 8, wherein the control signal generator controls the filter module to output the plurality of low-pass analog signals via the control signal before the second decision unit determines the length of the channel.

13. The reception device of claim 8, wherein the control signal generator controls the filter module to output the plurality of band-pass analog signals via the control signal when the length of the channel, determined by the second decision unit, is greater than a predefined value.

* * * * *